United States Patent Office 2,766,270
Patented Oct. 9, 1956

2,766,270

ACYCLIC, POLYNITRILE-CONTAINING, SULFONIUMALKOXYETHENOLATES AND THEIR PREPARATION

Vaughn Arthur Engelhardt and William Joseph Middleton, Claymont, Del., assignors to E. I. du Pont de Nemours and Company, Wilmington, Del., a corporation of Delaware No Drawing. Application September 29, 1955, Serial No. 537,568

15 Claims. (Cl. 260—465)

This invention is concerned with a new class of organic inner-salts and their preparation and, more particularly, with 2,2-dicyano-1-[(disubstitutedsulfonium)alkoxy]ethenolates.

Sulfonium compounds are discussed by Sidgwick, "Chemical Elements and Their Compounds" (Oxford, Clarendon Press, 1950), vol. II, pg. 890: "Sulphur, like oxygen, is able to increase its valency by one by losing an electron, and so pass into a tricovalent cation [$R_3S$]+, corresponding to the oxonium ion [$R_3O$]+, but much more stable."

It is an object of the present invention to provide a new class of compounds having a positively charged sulfonium function balanced by the presence in the same molecule of a negatively charged ethenolate function. Another object is to provide a process for preparing such compounds. Other objects of the invention will become apparent from the specification and claims.

It has now been found that a new and useful class of sulfonium inner-salt compounds can be obtained by reaction of a dicyanoketene cyclic acetal with a hydrocarbon sulfide (reactants of the general formula, $R_1$—S—$R_2$, wherein $R_1$ and $R_2$ represent hydrocarbon radicals which may be alike or different and may be joined to form an alicyclic ring), or a thioamide or a thiourea (including thiosemicarbazide and other N-substituted thioureas). Structurally these new compounds are 2,2-dicyano-1-($\omega$-sulfoniumalkoxy)ethenolates, in which the two bonds of the sulfur atom other than the one attached to the alkoxy group are both attached to carbon, i. e., in two separate carbons of hydrocarbon radicals or in a methylene radical in which the methylene carbon atom is in turn attached to one amino radical and one hydrocarbon radical or is attached to two amino radicals.

The preferred products of this invention can be represented by the general formula

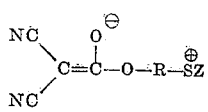

wherein SZ is a sulfonium group corresponding to a hydrocarbon sulfide or a thioamide or a thiourea (including thiosemicarbazide and other N-substituted thioureas), and R is a divalent acyclic hydrocarbon group of 2 to 8 carbons having a chain of 2 to 3 carbons connecting the oxygen and sulfur atoms. Thus, when a hydrocarbon sulfide is used to form a dihydrocarbonsulfonium product, Z represents two monovalent hydrocarbon radicals attached to the sulfur atom; when a thioamide is used to form an acylimidiumthio product, Z represents the group

where A is an amino radical and R' is a monovalent hydrocarbon radical; and when a thiourea is used to form an S-isothiouronium product, Z represents the group

where A and A' are both amino radicals.

It is recognized that the sulfonium ethenolates of the present invention are meso-ionic compounds (Baker et al., J. Chem. Soc., 1949, 310) in that they are not well represented by an ordinary covalent structural formula, but are more accurately portrayed as resonance hybrids of more than one ionic formula. Among the several resonance forms which are possible for each of the products of this invention, the sulfonium ethenolate inner-salt structure outlined in the definition above is common to all of the products of this invention. However, it is to be understood that this particular arrangement of the charges in the inner-salt structure may not necessarily be the most abundant of the resonance hybrid forms possible for each compound. Some of the possible resonance forms for one of the products of this invention may be illustrated as follows:

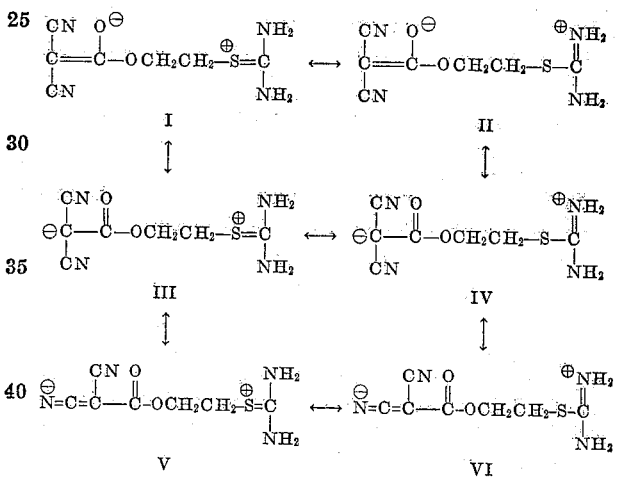

Formula I represents the type of sulfonium ethenolate inner-salt denoted in the general formula above.

The starting materials for this invention are the cyclic acetals of dicyanoketene, particularly the 2-dicyanomethylene-1,3-dioxolanes (dicyanoketene ethylene acetals) and the 2-dicyanomethylene-1,3-dioxanes (dicyanoketene trimethylene acetals). These compounds may be prepared from malononitrile by the following procedures:

To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1–2 mm.).

Substituted or unsubstituted 2-dicyanomethylene-1,3-dioxolanes and 2-dicyanomethylene-1,3-dioxanes are prepared by dissolving tetracyanoethylene in an excess of dihydric alcohol, such as a substituted or unsubstituted ethylene glycol or 1,3-propylene glycol, adding a catalyst (such as a small amount of urea) and heating the solution to boiling until the dark color characteristic of the solution of tetracyanoethylene in the glycol is dispelled. The mixture is cooled and the 2-dicyanomethylene-1,3-cyclic acetal crystallizes out.

The process of this invention can be carried out under very mild conditions since the reaction takes place readily at room temperature and at atmospheric pressure. It is ordinarily convenient to provide for dissipation of the heat of reaction by carrying out the process in the presence of an inert liquid diluent. Such a diluent is preferably a substantially anhydrous mutual solvent for the reactants, and can be an alcohol such as methyl or ethyl alcohol, ketones such as acetone, a cyclic ether such as tetrahydrofuran, an aliphatic nitrile such as acetonitrile, or an ester such as methyl or ethyl acetate. The process of the invention may be carried out in the presence of water, but this is not a preferred procedure. The diluent may be a solvent for the product, but it is more convenient to have the desired product separate as a precipitate as it is formed. The presence of a liquid diluent is not essential to the process. For example, when the sulfur-containing starting material to be employed is a liquid, for example, dimethyl sulfide, it suffices to dissolve the dicyanomethylene-1,3 cyclic acetal in the dimethyl sulfide and allow the reaction to proceed without the presence of other additives.

In a preferred embodiment of the process of this invention, a dicyanoketene cyclic acetal (such as dicyanoketene ethylene acetal) and a hydrocarbon sulfide, a thioamide or a thiourea (e. g., an N-substituted thiourea) are dissolved in an inert mutual solvent. The solution is allowed to stand at room temperature for several days, during which time the corresponding 2,2-dicyano-1-[(disubstitutedsulfonium)alkoxy] ethenolate slowly forms and separates as a precipitate which is collected by filtration and purified by washing with additional quantities of the solvent.

In the following examples, which illustrate specific embodiments of the invention, parts are by weight.

EXAMPLE I

*2,2-dicyano-1-[2-(dimethylsulfonium)ethoxy]ethenolate*

A solution of 1360 parts of dicyanoketene ethylene acetal and 1792 parts of methyl sulfide in 3960 parts of acetone is prepared and allowed to stand at room temperature for 3 days. The white solid which precipitates is collected on a filter and washed with acetone. There is obtained 1665 parts of 2,2-dicyano-1-[2-(dimethylsulfonium)ethoxy]ethenolate in the form of white crystals, M. P. 180–182° C. with decomposition.

*Analysis.*—Calcd. for $C_8H_{10}N_2O_2S$: C, 48.47; H, 5.08; N, 14.13; S, 16.14. Found: C, 48.93; H, 5.22; N, 14.29, 14.24; S, 15.96.

EXAMPLE II

*2,2-dicyano-1-[3-(dimethylsulfonium)propoxy]ethenolate*

A solution of 750 parts of dicyanoketene trimethylene acetal and 846 parts of methyl sulfide in 1980 parts of acetone is prepared and allowed to stand at room temperature for 3 days. The white crystalline material which precipitates is collected on a filter and washed with ether (880 parts). This material is recrystallized from water to give 750 parts of 2,2-dicyano-1-[3-(dimethylsulfonium)propoxy]ethenolate in the form of white needles, M. P. 170–171° C.

*Analysis.*—Calcd. for $C_9H_{12}SO_2N_2$: C, 50.92; H, 5.70; N, 13.20; S, 15.10. Found: C, 51.13; H, 5.66; N, 13.37, 13.32; S, 15.40.

EXAMPLE III

*2,2-dicyano-1-[2-(diethylsulfonium)ethoxy]ethenolate*

A solution of 680 parts of dicyanoketene ethylene acetal and 846 parts of ethyl sulfide in 1980 parts of acetone is prepared and allowed to stand at room temperature for two weeks and then evaporated to dryness. The white residue is recrystallized from alcohol to give 700 parts of 2,2-dicyano-1-[2-(diethylsulfonium)ethoxy]ethenolate in the form of a white crystalline solid, M. P. 105–107° C.

*Analysis.*—Calcd. for $C_{10}H_{14}N_2O_2S$: C, 53.07; H, 6.24; N, 12.38; S. 14.17. Found: C, 53.15, 53.11; H, 6.34, 6.16; N, 12.61, 12.61; S, 14.12, 14.19.

EXAMPLE IV

*2,2-dicyano-1-[2-(S-isothiouronium)ethoxy]ethenolate*

A solution of 1360 parts of dicyanoketene ethylene acetal and 761 parts of thiourea in 7930 parts of warm (50° C.) methyl alcohol is prepared and allowed to cool to room temperature. The white crystalline precipitate which forms is collected on a filter and washed with tetrahydrofuran. There is obtained 1870 parts (88% yield) of 2,2-dicyano-1-[2-(S-isothiouronium)ethoxy]ethenolate in the form of white plates. A sample is recrystallized from water to give white plates, M. P. 235–237° C. with decomposition.

*Analysis.*—Calcd. for $C_7H_8N_4O_2S$: C, 39.61; H, 3.79; N, 26.40; S, 15.11. Found: C, 39.60, 39.86; H, 3.94, 3.84; N, 26.34, 26.29; S, 15.10, 15.12.

EXAMPLE V

*2,2-dicyano-1-[2-(S-(N-allylisothiouronium))ethoxy]-ethenolate*

A solution of 272 parts of dicyanoketene ethylene acetal and 232 parts of allylthiourea in 1188 parts of acetone is prepared and allowed to stand at room temperature for 20 hours. The solid which precipitates is collected on a filter (495 parts) and recrystallized from water to give 380 parts of 2,2-dicyano-1-[2-(S-(N-allylisothiouronium))ethoxy]ethenolate in the form of white needles, M. P. 204–205° C.

*Analysis.*—Calcd. for $C_{10}H_{12}N_4SO_2$: C, 47.60; H, 4.80; N, 22.20; S, 12.71. Found: C, 47.58, 47.65; H, 4.96, 4.82; N, 22.18, 22.52; S, 12.88, 13.20.

EXAMPLE VI

*2,2-dicyano-1-[2-(S-(N-,N'-diisopropylisothiouronium))ethoxy]ethenolate*

A solution of 800 parts of N,N'-diisopropylthiourea and 680 parts of dicyanoketene ethylene acetal in 7920 parts of acetone is prepared and allowed to stand overnight. The white solid which precipitates is collected on a filter and washed with acetone. There is obtained 1400 parts of 2,2-dicyano-1-[2-(S-(N,N'-diisopropylsiothiouronium))ethoxy]ethenolate in the form of a white crystalline powder, M. P. 199–201° C.

*Analysis.*—Calcd. for $C_{13}H_{20}N_4SO_2$: C, 52.68; H, 6.80; N, 18.90; S, 10.82. Found: C, 52.96, 52.86; H, 6.86, 6.76; N, 18.90, 18.93; S, 10.96, 11.00.

EXAMPLE VII

*2,2-dicyano-1-[2-(S-isothiosemicarbazidium)ethoxy]ethenolate*

A solution of 91 parts of thiosemicarbazide and 136 parts of dicyanoketene ethylene acetal in 1116 parts of ethylene glycol is heated to 100° C. and then allowed to cool to room temperature, mixed with 1000 parts of water and cooled to 10° C. The white crystalline solid which precipitates is collected on a filter and washed with water. There is obtained 178 parts of 2,2-dicyano-1-[2-(S-isothiosemicarbazidium)ethoxy]ethenolate in the form of white needles. A portion is recrystallized from water to give long, white needles, M. P. 206–207° C.

*Analysis.*—Calcd. for $C_7H_9N_5SO_2$: C, 37.00; H, 3.99; N, 30.82; S,14.11. Found: C, 37.27, 37.39; H, 4.08, 4.07; N, 30.80, 31.15; S, 14.39.

EXAMPLE VIII

*2,2-dicyano-1-[2-(acetimidiumthio)ethoxy]ethenolate*

A solution of 136 parts of dicyanoketene ethylene acetal and 75 parts of thioacetamide in 792 parts of acetone is prepared and allowed to stand at room temperature for 3 hours. The white crystalline mass which separates is collected on a filter, washed with acetone and dried. There is obtained 129 parts of 2,2-dicyano-1-[2-(acetimidiumthio)ethoxy]ethenolate in the form of white prisms, M. P. 177–180° C.

*Analysis.*—Calcd. for $C_8H_9N_3SO_2$: C, 45.49; H, 4.29; N, 19.89; S, 15.67. Found: C, 45.67, 45.61; H, 4.42, 4.50; N, 19.57, 19.60; S, 15.52, 15.40.

EXAMPLE IX

*2,2-dicyano-1-[2-(benzimidiumthio)ethoxy]ethenolate*

A solution of 685 parts of thiobenzamide and 680 parts of dicyanoketene ethylene acetal and 3960 parts of acetone is allowed to stand overnight at room temperature. The white solid which precipitates is collected on a filter and washed with acetone. There is obtained 605 parts of 2,2-dicyano-1-[2-benzimidiumthio)ethoxy]ethenolate as a white crystalline solid, M. P. 213–214° C.

*Analysis.*—Calcd. for $C_{13}H_{11}N_3SO_2$: C, 57.13; H, 4.06; N, 15.38; S, 11.73. Found: C, 57.08, 57.19; H, 4.19, 4.12; N, 15.50, 15.54; S, 11.86, 11.95.

Other products illustrative of this invention are prepared by appropriate variation of the reactants. For example, when 2-dicyanomethylene-4-methyl-1,3-dioxolane reacts with di-n-octyl sulfide according to the process of this invention, 2,2-dicyano-1-[2-(dioctylsulfonium)-2-methylethoxy]ethenolate is obtained. When 2-dicyanomethylene-4,4,5,5-tetramethyl-1,3-dioxolane reacts with diphenyl sulfide, 2,2-dicyano-1-[2-(diphenylsulfonium)-1,1,2,2-tetramethylethoxy]ethenolate is obtained. When 2-dicyanomethylene-1,3-dioxolane reacts with thiostearamide, 2,2-dicyano-1-[2-(stearimidiumthio)ethoxy]ethenolate is obtained. When 2-dicyanomethylene-4,5-di-n-propyl-1,3-dioxolane reacts with tetramethylthiourea, 2,2 - dicyano - 1 - [2 - (S - tetramethylisothiouronium) - 1,2-di-n-propylethoxy]ethenolate is obtained. When 2 - dicyanomethylene - 4,4,6 - trimethyl-1,3-dioxane reacts with phenylthiourea, 2,2-dicyano-1-[3-(S-phenylisothiouronium)-1,3,3-trimethylpropoxy]ethenolate is obtained. When 2-dicyanomethylene-1,3-dioxane reacts with N,N'-di-n-heptadecylthiourea, 2,2-dicyano-1-[3-(S-[N,N' - di - n - heptadecylisothiouronium])propoxy]-ethenolate is obtained. When 2-dicyanomethylene-1,3-dioxolane reacts with thiobenzanilide, 2,2-dicyano-1-[2-(N-phenylbenzimidiumthio)ethoxy]ethenolate is obtained.

The compounds of this invention may be used for the detection of various types of electromagnetic radiation, for example X-rays or gamma rays. They are of particular value in devices such as scintillation counters where they are preferably employed in the form of large single crystals. The capacity of the compounds of this invention for fluorescence under the influence of X-rays is illustrated in the following table:

| Example | Compound | Luminescence under X-ray |
|---|---|---|
| I | 2,2 - Dicyano - 1 - [2 - (dimethylsulfonium) - ethoxy]ethenolate | blue. |
| II | 2,2 - Dicyano - 1 - [3 - (dimethylsulfonium) - propoxy]ethenolate | blue. |
| III | 2,2 - Dicyano - 1 - [2 - (diethylsulfonium) - ethoxy]ethenolate | blue. |
| VII | 2,2-Dicyano-1-[2-(S-isothiosemicarbazidium) ethoxy]ethenolate | blue. |
| VIII | 2,2-Dicyano-1-[2-(acetimidiumthio)-ethoxy] ethenolate | blue. |
| IX | 2,2-Dicyano-1-[2-(benzimidiumthio)-ethoxy] ethenolate | yellow. |

Since many different embodiments of the invention may be made without departing from the spirit and scope thereof, it is to be understood that the invention is not limited by the specific illustration except to the extent defined in the following claims.

What is claimed is:

1. A compound represented by the general formula

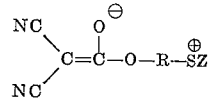

wherein SZ is a sulfonium group corresponding to a thio compound selected from the group consisting of hydrocarbon sulfides, thioamides and thioureas, and R is a divalent acyclic hydrocarbon group of 2 to 8 carbons having a chain of 2 to 3 carbons connecting the oxygen and sulfur atoms.

2. A 2,2-dicyano-1-[(acylimidiumthio)alkoxy]ethenolate.

3. A 2,2-dicyano-1-[(S-isothiouronium)alkoxy]ethenolate.

4. A 2,2 - dicyano - 1 -[2-(dimethylsulfonium)ethoxy]-ethenolate.

5. A 2,2-dicyano-1-[3-(dimethylsulfonium)propoxy]-ethenolate.

6. A 2,2-dicyano-1-[2-(S-isothiouronium)ethoxy]ethenolate.

7. A 2,2-dicyano-1-[2-(S-isothiosemicarbazidium)ethoxy]ethenolate.

8. A 2,2-dicyano-1-[2-(benzimidiumthio)ethoxy]ethenolate.

9. The process for preparing a 2,2-dicyano-1-($\omega$-sulfoniumalkoxy)ethenolate which comprises reacting a 2-dicyanomethylene cyclic 1,3-acetal with at least a substantially molecular equivalent amount of a thio compound selected from the group consisting of hydrocarbon sulfides, thioamides and thioureas.

10. A process as defined in claim 9 wherein the reaction is carried out in an inert liquid diluent under substantially atmospheric conditions.

11. A process as defined in claim 9 wherein the reaction is carried out in a substantially anhydrous inert mutual solvent for the reactants.

12. A process as defined in claim 9 wherein the thio compound is a thioether.

13. A process as defined in claim 9 wherein the thio compound is a thioamide.

14. A process as defined in claim 9 wherein the thio compound is a thiourea.

15. A process as defined in claim 9 wherein the thio compound is a thiosemicarbazide.

References Cited in the file of this patent

UNITED STATES PATENTS 2,721,206    Middleton _____ Oct. 18, 1955